(12) United States Patent
Yamaguchi et al.

(10) Patent No.: US 7,316,219 B2
(45) Date of Patent: Jan. 8, 2008

(54) CONTROL APPARATUS FOR VEHICLE

(75) Inventors: Katsuhiko Yamaguchi, Nisshin (JP); Toshio Inoue, Gotenba (JP); Mamoru Tomatsuri, Toyota (JP); Keiko Hasegawa, Toyota (JP); Keita Fukui, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/369,959

(22) Filed: Mar. 8, 2006

(65) Prior Publication Data

US 2006/0207567 A1 Sep. 21, 2006

(30) Foreign Application Priority Data

Mar. 18, 2005 (JP) ............................. 2005-078389

(51) Int. Cl.
*F02B 7/00* (2006.01)
*F02M 43/00* (2006.01)

(52) U.S. Cl. ...................... 123/431; 123/304

(58) Field of Classification Search ................ 123/294, 123/304, 429, 431, 432
See application file for complete search history.

(56) References Cited

U.S. PATENT DOCUMENTS

| | | | |
|---|---|---|---|
| 5,074,263 A | | 12/1991 | Emerson |
| 5,540,204 A | * | 7/1996 | Schnaibel et al. ........... 123/481 |
| 6,039,032 A | * | 3/2000 | Morikawa et al. ........... 123/520 |
| 6,959,693 B2 | * | 11/2005 | Oda .............................. 123/431 |
| 6,978,762 B2 | * | 12/2005 | Mori ............................ 123/430 |
| 2001/0042535 A1 | | 11/2001 | Yamazaki et al. |
| 2004/0007209 A1 | | 1/2004 | Ohtani |
| 2005/0016500 A1 | | 1/2005 | Borg et al. |
| 2005/0016503 A1 | | 1/2005 | Borg et al. |
| 2005/0098156 A1 | * | 5/2005 | Ohtani ......................... 123/431 |
| 2005/0178360 A1 | * | 8/2005 | Satou ........................... 123/431 |
| 2005/0257771 A1 | | 11/2005 | Nakayama et al. |
| 2006/0185643 A1 | * | 8/2006 | Lee et al. ..................... 123/295 |
| 2006/0219215 A1 | * | 10/2006 | Brachert et al. ............. 123/299 |
| 2007/0103033 A1 | * | 5/2007 | Martin ......................... 310/317 |
| 2007/0119421 A1 | * | 5/2007 | Lewis et al. ................. 123/431 |
| 2007/0163537 A1 | * | 7/2007 | Kamio et al. ................ 123/304 |

FOREIGN PATENT DOCUMENTS

| | | |
|---|---|---|
| EP | 1 154 154 A2 | 11/2001 |
| EP | 1 500 807 A2 | 1/2005 |

(Continued)

*Primary Examiner*—John T. Kwon
(74) *Attorney, Agent, or Firm*—Oliff & Berridge, PLC

(57) ABSTRACT

In a vehicle incorporating an internal combustion engine having in-cylinder injectors and intake manifold injectors and performing engine intermittent operation control, at the end of vehicle operation, the fuel pressure is decreased in both a high-pressure delivery pipe and a low-pressure delivery pipe by actuation (opening) of an electromagnetic relief valve and by stop of operation of a low-pressure fuel pump. This prevents deterioration in emission performance at the next engine start attributable to fuel leakage due to degradation in oil tightness of the injectors during the operation stop period. When the engine is temporarily stopped by engine intermittent operation control, while the low-pressure fuel pump is stopped, actuation (opening) of the electromagnetic relief valve is prohibited. At the engine restart after temporary stop, the fuel in the high-pressure delivery pipe having its pressure secured at a certain level is injected to quickly start the engine.

12 Claims, 11 Drawing Sheets

FOREIGN PATENT DOCUMENTS

| | | |
|---|---|---|
| JP | A 05-231221 | 9/1993 |
| JP | A 05-231256 | 9/1993 |
| JP | A 07-103048 | 4/1995 |
| JP | A 07-293381 | 11/1995 |
| JP | A 08-028382 | 1/1996 |
| JP | A 10-089176 | 4/1998 |
| JP | A 2000-064875 | 2/2000 |
| JP | A 2004-278347 | 10/2004 |
| JP | A 2004-278365 | 10/2004 |
| WO | WO 2005/113968 | 12/2000 |

* cited by examiner

CONTROL APPARATUS FOR VEHICLE

This nonprovisional application is based on Japanese Patent Application No. 2005-078389 filed with the Japan Patent Office on Mar. 18, 2005, the entire contents of which are hereby incorporated by reference.

BACKGROUND OF THE INVENTION

1. Field of the Invention

The present invention relates to a control apparatus for a vehicle, and more particularly to a control apparatus for a vehicle mounted with an internal combustion engine having a first fuel injection mechanism (in-cylinder injector) for injecting fuel into a cylinder and a second fuel injection mechanism (intake manifold injector) for injecting fuel into an intake manifold and/or an intake port.

2. Description of the Background Art

A fuel injection apparatus provided with an in-cylinder injector for injecting fuel into a cylinder and an intake manifold injector for injecting fuel into an intake port, and controlling the in-cylinder injector and the intake manifold injector in accordance with an operation state to inject the fuel by combination of intake manifold injection and in-cylinder direct injection is known (e.g., Japanese Patent Laying-Open No. 07-103048, which is also referred to as "Patent Document 1" hereinafter).

In a fuel supply system for supplying the fuel at a prescribed fuel pressure to the injectors, generally, one fuel line extending from a fuel tank toward the internal combustion engine is branched in the vicinity of the internal combustion engine so as to supply the fuel to the intake manifold injector and to the in-cylinder injector. With this configuration, however, the fuel line has a complicated configuration in the vicinity of the internal combustion engine, and the fuel supplied from the fuel tank may be subjected to a great amount of heat from the engine block of the internal combustion engine. The fuel supplied to the intake manifold injector is a fuel of a low pressure that is pumped up from the fuel tank by using a low-pressure fuel pump. As such, it has been pointed out that the fuel, when subjected to the great amount of heat from the engine block, may partially vaporize in the fuel line or a delivery pipe for supplying the fuel into the intake manifold injector, leading to occurrence of vapor lock.

To address such a problem, for example, Japanese Patent Laying-Open No. 2004-278347 (hereinafter, also referred to as "Patent Document 2") discloses a fuel supply system in which a fuel tank, a low-pressure fuel pump, a fuel pressure regulator (pressure regulator), an intake manifold injection (low-pressure) delivery pipe, a high-pressure fuel pump, an in-cylinder injection (high-pressure) delivery pipe, and a relief valve are arranged in series. In a fuel injection apparatus provided with such a fuel supply system, it is possible to prevent fuel injection failure attributable to the vapor lock caused in the pipe connected to the intake manifold injector, with a simple configuration.

In the fuel injection apparatus disclosed in Patent Document 2, the intake manifold injection (low-pressure) delivery pipe is arranged downstream of the fuel pressure regulator. Thus, although an electromagnetic relief valve for releasing pressure is arranged downstream of the in-cylinder injection (high-pressure) delivery pipe, it is difficult to intentionally release the fuel pressure of the low-pressure delivery pipe at the time of stop of operation of the vehicle. This leads to poor oil tightness, and there may occur leakage of the fuel from the intake manifold fuel injection valve during stop of operation of the vehicle. Such leakage of the fuel may lead to deterioration in emission performance at the time of next start of the engine.

In a hybrid vehicle further provided with an electric motor as another source of driving force other than the internal combustion engine, or in a vehicle mounted with a so-called economy running system that forcibly stops idling of the engine at the time of temporary stop of the vehicle (hereinafter, also simply called the "eco run vehicle"), "engine intermittent operation control" is carried out in which an engine is temporarily stopped when a prescribed engine stop condition is satisfied, and restarted in response to fulfillment of an engine stop reset condition.

In the vehicle conducting such engine intermittent operation control, there are two cases of engine stop: one is stop associated with end of vehicle operation, and the other is temporary stop with an assumption of restart of the engine. While it is necessary to secure quick starting capability upon restart of the engine in the case of temporary stop of the engine according to the engine intermittent operation control, at the time of engine stop associated with the end of vehicle operation, it is necessary to prevent deterioration in emission performance upon next start of vehicle operation attributable to degradation in oil tightness.

Further, there are also two cases of engine start: one is initial start associated with start of vehicle operation, and the other is restart following temporary stop in the engine intermittent operation. It is preferable to set optimal engine starting conditions for the respective cases for the purposes of securing starting capability of the engine as well as preventing deterioration in emission performance.

SUMMARY OF THE INVENTION

In view of the foregoing, an object of the present invention is to provide a control apparatus for a vehicle incorporating an internal combustion engine having a first fuel injection mechanism (in-cylinder injector) for injecting fuel into a cylinder and a second fuel injection mechanism (intake manifold injector) for injecting fuel into an intake manifold and/or an intake port and performing engine intermittent operation control, that ensures smooth starting performance and also prevents deterioration in emission performance at the time of engine start.

Another object of the present invention is to provide a control apparatus for a vehicle incorporating an internal combustion engine having an in-cylinder injector and an intake manifold injector and also incorporating another driving force source other than the internal combustion engine, that ensures smooth starting performance and also prevents deterioration in emission performance at the time of engine start.

A control apparatus for a vehicle according to the present invention is for a vehicle incorporating an internal combustion engine having a first fuel supply system supplying fuel to a first fuel injection mechanism for injecting fuel into a cylinder and a second fuel supply system supplying fuel to a second fuel injection mechanism for injecting fuel into an intake manifold, and includes a fuel injection control portion, an intermittent operation control portion, and a first pressure release control portion. The fuel injection control portion controls a fuel injection ratio between the first fuel injection mechanism and the second fuel injection mechanism with respect to a total fuel injection quantity. The intermittent operation control portion automatically stops the internal combustion engine temporarily when a prescribed condition is satisfied after start of operation of the vehicle. The first pressure release control portion controls a first pressure release mechanism that is configured to guide the fuel in the first fuel supply system to a pressure release path when actuated. The first pressure release control portion prohibits actuation of the first pressure release mechanism when the internal combustion engine is in an automatically stopped state by the intermittent operation control portion. The fuel injection control portion includes a first startup-time injection control portion configured to set a ratio of a quantity of the fuel injected from the first fuel injection mechanism to the total fuel injection quantity near 100% when the internal combustion engine is restarted from the automatically stopped state.

According to the control apparatus for a vehicle described above, in the vehicle incorporating the internal combustion engine having the first fuel injection mechanism (in-cylinder injector) and the second fuel injection mechanism (intake manifold injector) and performing the engine intermittent operation control to automatically stop the internal combustion engine temporarily after start of operation of the engine, the fuel of almost all of the total fuel injection quantity is injected from the first fuel injection mechanism (in-cylinder injector) at the time of engine restart after temporary stop of the engine by the engine intermittent operation control, by securing the fuel pressure of a required level in the first fuel supply system for the in-cylinder fuel injection, without actuating the first pressure release mechanism. In the engine intermittent operation after start of vehicle operation, the temperature in the combustion chamber has been increased, and the catalyst has also reached the active temperature. Thus, the in-cylinder fuel injection would not cause deterioration in emission performance. Accordingly, it is possible to quickly start the in-cylinder fuel injection at the time of engine restart by the engine intermittent operation control, to ensure starting capability of the vehicle without deteriorating emission performance.

Preferably, the control apparatus for a vehicle of the present invention further includes a second pressure release control portion. The second pressure release control portion controls a second pressure release mechanism that is configured to release a fuel pressure of the second fuel supply system when actuated. Further, the first and second pressure release control portions actuate the first and second pressure release mechanisms, respectively, in response to stop of the internal combustion engine in association with end of operation of the vehicle.

According to the control apparatus for a vehicle described above, at the end of vehicle operation, the fuel pressure can be decreased by actuating the pressure release mechanisms in both of the first fuel supply system and the second fuel supply system. This can prevent occurrence of fuel leakage due to degradation in oil tightness of the first and second fuel injection mechanisms (injectors) during the period where the vehicle operation is stopped until next start of operation. Accordingly, deterioration in emission performance at the next start of the internal combustion engine can be prevented.

Still preferably, in the control apparatus for a vehicle of the present invention, the first pressure release control portion actuates the first pressure release mechanism at the end of operation of the vehicle, after a lapse of a prescribed time that is set to allow a decrease of a temperature of the fuel in the first fuel supply system to a prescribed level.

In the control apparatus for a vehicle described above, the fuel pressure is decreased at the end of vehicle operation only after the fuel temperature in the first fuel supply system supplying the high-pressure fuel is decreased to a prescribed level. As such, it is possible to prevent vapor lock that would occur due to boiling under reduced pressure when the pressure is rapidly released while the fuel temperature is still high.

Preferably, the control apparatus for a vehicle according to the present invention further includes a fuel pump control portion, which is configured to control a fuel pump for securing a fuel pressure necessary for the second fuel supply system. The fuel pump control portion stops operation of the fuel pump each time when the internal combustion engine is automatically stopped by the intermittent operation control portion and when the internal combustion engine is stopped in association with end of operation of the vehicle.

According to the control apparatus for a vehicle described above, the fuel pump is stopped in association with the temporary stop of the internal combustion engine by the intermittent operation control. This can improve fuel efficiency.

Still preferably, in the control apparatus for a vehicle according to the present invention, the fuel injection control portion includes a second startup-time injection control portion. The second startup-time injection control portion sets a ratio of a quantity of the fuel injected from the second fuel injection mechanism to the total fuel injection quantity near 100% when the internal combustion engine is started in association with start of operation of the vehicle.

According to the control apparatus for a vehicle described above, the fuel of almost all of the total fuel injection quantity required is injected from the second fuel injection mechanism (intake manifold injector) at the start of the internal combustion engine in association with start of vehicle operation. As such, at the time when the temperature of the combustion chamber and the temperature of the catalyst are both low, the engine is started by injecting fuel into the intake manifold and/or the intake port, rather than directly injecting the fuel into the cylinder. Accordingly, the engine can be started without causing the inconvenience such as deterioration in emission performance or deterioration in lubrication performance of the internal combustion engine by performing in-cylinder fuel injection in the engine cold state.

Particularly, in the above-described configuration, the vehicle further incorporates a driving force source besides the internal combustion engine, and the control apparatus further includes a driving force ratio control portion. The driving force ratio control portion controls a ratio of driving force generated by the internal combustion engine and by the driving force source, in accordance with an operation state. Further, the driving force ratio control portion instructs the driving force source to generate driving force corresponding to the driving force required for the vehicle as a whole, when the internal combustion engine is started in association with start of operation of the vehicle, and when a fuel pressure in the second fuel supply system is lower than a required level.

According to the control apparatus for a vehicle described above, in the configuration where the vehicle is further provided with another driving force source (typically, an electric motor) in addition to the internal combustion engine, the driving force required for the vehicle as a whole is provided by using the other driving force source when the fuel pressure in the second fuel supply system supplying the fuel to the second fuel injection mechanism (intake manifold injector) has not reached a required pressure level in the engine cold state. Accordingly, it is possible to ensure quick starting capability of the vehicle without causing the inconvenience by performing in-cylinder fuel injection in the engine cold state.

According to the control apparatus for a vehicle described above, at the engine start associated with start of vehicle operation, the internal combustion engine is started with the fuel injected from the second fuel injection mechanism (intake manifold injector), and in the case where the fuel pressure in the second fuel supply system supplying the fuel to the second fuel injection mechanism has not reached a required pressure level, the driving force requested to the vehicle is addressed by using the driving force generated by the other driving force source. As a result, it is possible to secure quick starting capability of the vehicle without causing the inconvenience by performing in-cylinder fuel injection in the engine cold state.

A control apparatus for a vehicle according to another configuration of the present invention is for a vehicle incorporating an internal combustion engine, which has a first fuel supply system supplying fuel to a first fuel injection mechanism for injecting fuel into a cylinder and a second fuel supply system supplying fuel to a second fuel injection mechanism for injecting fuel into an intake manifold, and a driving force source other than the internal combustion engine, and includes a driving force ratio control portion and a fuel injection control portion. The driving force ratio control portion controls a ratio of driving force generated by the internal combustion engine and by the driving force source in accordance with an operation state. The fuel injection control portion controls a fuel injection ratio between the first fuel injection mechanism and the second fuel injection mechanism with respect to a total fuel injection quantity in the internal combustion engine. The fuel injection control portion includes a startup-time injection control portion, which sets a ratio of a quantity of the fuel injected from the second fuel injection mechanism to the total fuel injection quantity near 100% when the internal combustion engine is started in association with start of operation of the vehicle. Further, the driving force ratio control portion instructs the driving force source to generate driving force corresponding to the driving force required for the vehicle as a whole, when a fuel pressure in the second fuel supply system is lower than a required level.

According to the control apparatus for a vehicle described above, at the start of the internal combustion engine in association with start of operation of the vehicle that incorporates the internal combustion engine that can effect both in-cylinder fuel injection and intake manifold fuel injection and another driving force source (typically, an electric motor) other than the internal combustion engine, the internal combustion engine is started with the fuel injected from the second fuel injection mechanism (intake manifold injector). Further, when the fuel pressure in the second fuel supply system supplying the fuel to the second fuel injection mechanism has not reached a required level, the driving force requested to the vehicle is addressed by the driving force generated by the other driving force source. As a result, it is possible to ensure quick starting capability of the vehicle without causing the inconvenience (typically, deterioration in emission performance) by performing in-cylinder fuel injection in the engine cold state.

Preferably, the control apparatus for a vehicle according to the other configuration of the present invention further includes a fuel pump control portion. The fuel pump control portion controls a fuel pump for securing a fuel pressure necessary for the second fuel supply system, and starts operation of the fuel pump before a start instruction of the internal combustion engine is generated.

According to the control apparatus for a vehicle described above, the operation of the fuel pump is started prior to issuance of an instruction to start the internal combustion engine. Thus, particularly upon engine start in the engine cold state in association with start of vehicle operation, it is possible to secure the fuel pressure of a required level for the fuel injected from the second fuel injection mechanism (intake manifold injector) in an early stage, to allow quick start of the engine.

Still preferably, the driving force source is an electric motor powered by a secondary battery, and the vehicle further includes a charge control portion configured to charge the secondary battery by power generated by regenerative braking of the electric motor and by power generated by driving force of the internal combustion engine.

According to the control apparatus for a vehicle described above, in the hybrid vehicle incorporating an electric motor as another driving force source in addition to the internal combustion engine, the internal combustion engine can be started smoothly, without causing the problems of deterioration in emission performance and others.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
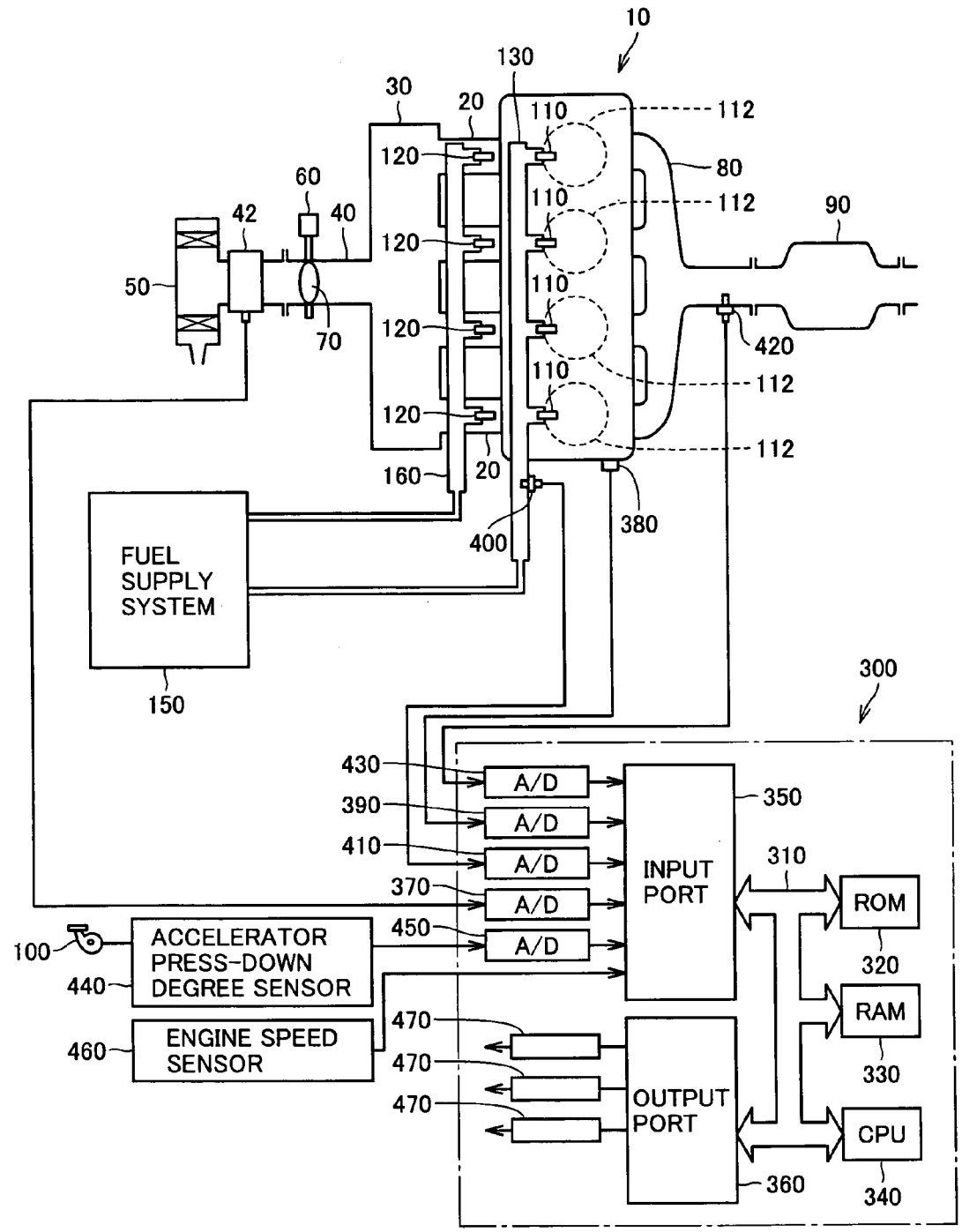
FIG. 1 is a schematic configuration diagram of an engine system that is controlled by a control apparatus according to an embodiment of the present invention.

Hereinafter, an embodiment of the present invention will be described in detail with reference to the drawings. In the drawings, the same or corresponding portions have the same reference characters allotted, and detailed description thereof will not be repeated in principle.

FIG. 1 schematically shows a configuration of an engine system provided with an internal combustion engine controlled by a control apparatus for a vehicle according to an embodiment of the present invention. Although an in-line 4-cylinder gasoline engine is shown in FIG. 1, application of the present invention is not restricted to the engine shown.

As shown in FIG. 1, the engine (internal combustion engine) 10 includes four cylinders 112, which are connected via corresponding intake manifolds 20 to a common surge tank 30. Surge tank 30 is connected via an intake duct 40 to an air cleaner 50. In intake duct 40, an airflow meter 42 and a throttle valve 70, which is driven by an electric motor 60, are disposed. Throttle valve 70 has its degree of opening controlled based on an output signal of an engine ECU (Electronic Control Unit) 300, independently from an accelerator pedal 100. Cylinders 112 are connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port and/or an intake manifold are provided.

Injectors 110, 120 are controlled based on output signals of engine ECU 300. In-cylinder injectors 110 are connected to a common fuel delivery pipe (hereinafter, also referred to as "high-pressure delivery pipe") 130, and intake manifold injectors 120 are connected to a common fuel delivery pipe (hereinafter, also referred to as "low-pressure delivery pipe") 160. Fuel supply to fuel delivery pipes 130, 160 is carried out by a fuel supply system 150, which will be described later in detail.

Engine ECU 300 is configured with a digital computer, which includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage of airflow meter 42 is input via an A/D converter 370 to input port 350. A coolant temperature sensor 380 is attached to engine 10, which generates an output voltage proportional to an engine coolant temperature. The output voltage of coolant temperature sensor 380 is input via an A/D converter 390 to input port 350.

A fuel pressure sensor 400 is attached to high-pressure delivery pipe 130, which generates an output voltage proportional to a fuel pressure in high-pressure delivery pipe 130. The output voltage of fuel pressure sensor 400 is input via an A/D converter 410 to input port 350. An air-fuel ratio sensor 420 is attached to exhaust manifold 80 located upstream of three-way catalytic converter 90. Air-fuel ratio sensor 420 generates an output voltage proportional to an oxygen concentration in the exhaust gas, and the output voltage of air-fuel ratio sensor 420 is input via an A/D converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of the air-fuel mixture burned in engine 10. As air-fuel ratio sensor 420, an $O_2$ sensor may be used which detects, in an on/off manner, whether the air-fuel ratio of the mixture burned in engine 10 is rich or lean with respect to a theoretical air-fuel ratio.

Accelerator pedal 100 is connected to an accelerator press-down degree sensor 440 that generates an output voltage proportional to the degree of press-down of accelerator pedal 100. The output voltage of accelerator press-down degree sensor 440 is input via an A/D converter 450 to input port 350. An engine speed sensor 460 generating an output pulse representing the engine speed is connected to input port 350. ROM 320 of engine ECU 300 prestores, in the form of a map, values of fuel injection quantity that are set corresponding to operation states based on the engine load factor and the engine speed obtained by the above-described accelerator press-down degree sensor 440 and engine speed sensor 460, respectively, and the correction values based on the engine coolant temperature.

Engine ECU 300 generates various control signals for controlling the overall operations of the engine system based on signals from the respective sensors by executing a prescribed program. The control signals are transmitted to the devices and circuits constituting the engine system via output port 360 and drive circuits 470.

Figure 2:
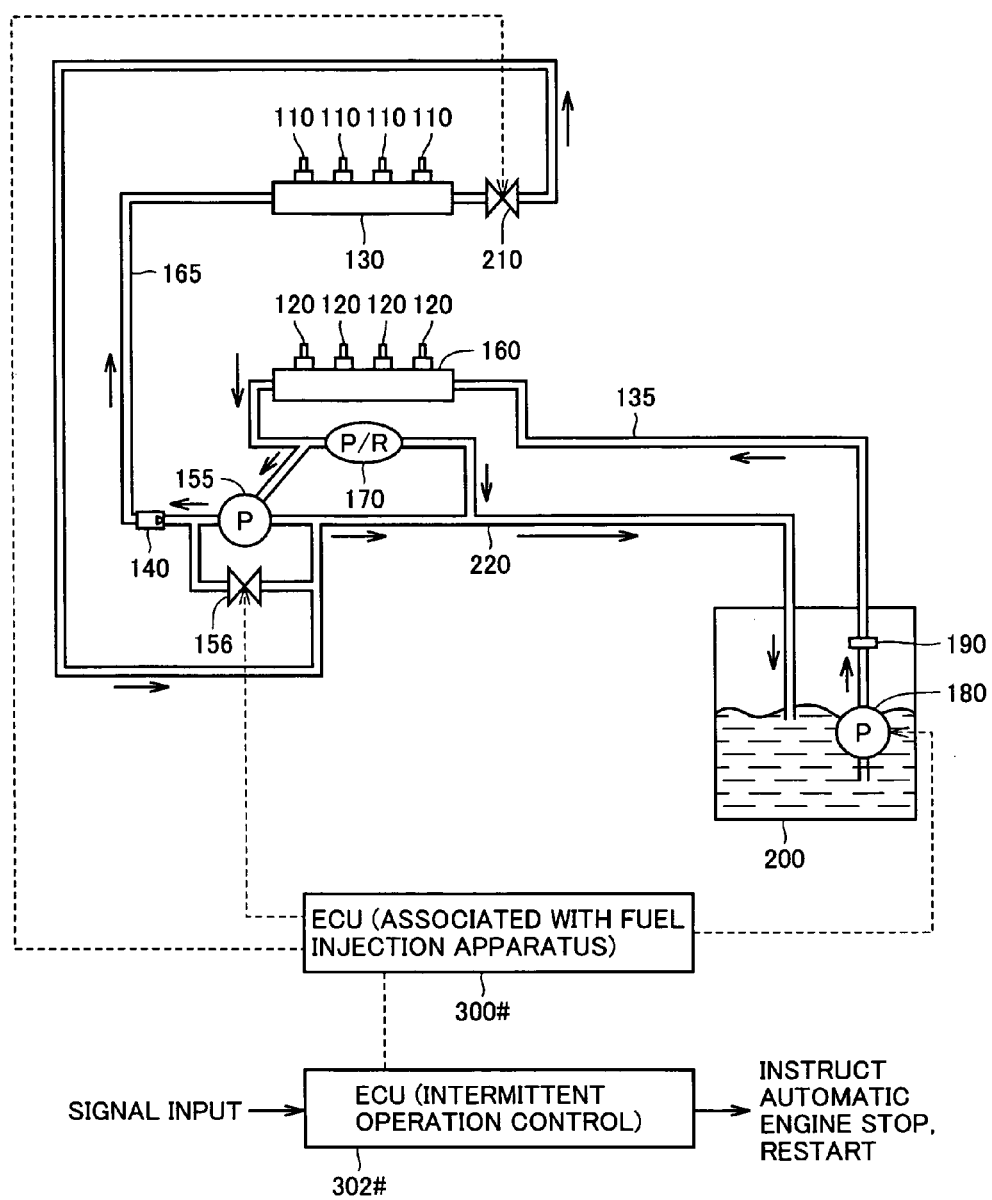
FIG. 2 illustrates a configuration example of a fuel supply system shown in FIG. 1.

FIG. 2 illustrates in detail the configuration of fuel supply system 150 shown in FIG. 1.

In FIG. 2, the portions other than in-cylinder injectors 110, high-pressure delivery pipe 130, intake manifold injectors 120 and low-pressure delivery pipe 160 correspond to the fuel supply system 150 of FIG. 1.

The fuel stored in a fuel tank 200 is discharged at a prescribed pressure by a low-pressure fuel pump 180 of an electric motor-driven type. Low-pressure fuel pump 180 is controlled based on an output signal from an ECU 300#. Here, ECU 300# corresponds to a functional part of engine ECU 300 of FIG. 1 that is related to control of the fuel injection apparatus.

The discharge side of low-pressure fuel pump 180 is connected via a fuel filter 190 and a fuel pipe 135 to a low-pressure delivery pipe 160 that is formed as a tubular body provided with intake manifold injectors 120. That is, low-pressure delivery pipe 160 receives the fuel discharged from low-pressure fuel pump 180 via fuel pipe 135 on the upstream side, and delivers the fuel to intake manifold injectors 120 so as to be injected into the internal combustion engine.

The downstream side of low-pressure delivery pipe 160 is connected via fuel pressure regulator 170 to the intake side of a high-pressure fuel pump 155 of an engine-driven type. Fuel pressure regulator 170 is configured to guide the fuel on the downstream side of low-pressure delivery pipe 160 to a fuel return pipe 220 when a pressure of the relevant fuel becomes higher than a preset pressure. As such, the fuel pressure in low-pressure delivery pipe 160 is maintained so as not to exceed the preset pressure.

The discharge side of high-pressure fuel pump 155 is connected to a fuel pipe 165 via a check valve 140 that allows the flow toward the fuel pipe 165. Fuel pipe 165 is connected to a high-pressure delivery pipe 130 that is formed as a tubular body provided with in-cylinder injectors 110.

The discharge side of high-pressure fuel pump 155 is also connected to the intake side of high-pressure fuel pump 155 via an electromagnetic spill valve 156. As the degree of opening of electromagnetic spill valve 156 decreases, the quantity of the fuel supplied from high-pressure fuel pump 155 to fuel pipe 165 increases. When electromagnetic spill valve 156 is fully open, fuel supply from high-pressure pump 155 to fuel pipe 165 is stopped. Electromagnetic spill valve 156 is controlled in response to an output signal of ECU 300#.

High-pressure delivery pipe 130 receives on its upstream side the fuel discharged from high-pressure fuel pump 155 via fuel pipe 165, and delivers the fuel to in-cylinder injectors 110 so as to be injected into the internal combustion engine. Further, an electromagnetic relief valve 210 is provided on the downstream side of high-pressure delivery pipe 130. Electromagnetic relief valve 210 is opened in response to a control signal from ECU 300#, and guides the fuel within high-pressure delivery pipe 130 to fuel return pipe 220.

As such, in the fuel injection system according to the present embodiment, low-pressure delivery pipe 160 and high-pressure delivery pipe 130 are arranged in series, as in Patent Document 2 described above, and then low-pressure delivery pipe 160 is arranged upstream of fuel pressure regulator 170.

Such a configuration makes it possible to decrease the fuel pressure in the high-pressure fuel supply system including high-pressure delivery pipe 130, by actuation (opening) of electromagnetic relief valve 210. Further, the fuel pressure in the low-pressure fuel supply system including low-pressure delivery pipe 160 is decreased by stop of operation of low-pressure fuel pump 180. In the fuel supply system shown in FIG. 2, the high-pressure fuel supply system including high-pressure delivery pipe 130 corresponds to the "first fuel supply system" of the present invention, and the low-pressure fuel supply system including low-pressure delivery pipe 160 corresponds to the "second fuel supply system" of the present invention. Further, electromagnetic relief valve 210 corresponds to the "first pressure release means", and issuance of the stop instruction of low-pressure fuel pump 180 corresponds to the "second pressure release means" of the present invention. Low-pressure fuel pump 180 corresponds to the "fuel pump", and the functional part of ECU 300# controlling operation of low-pressure fuel pump 180 corresponds to the "fuel pump control means" of the present invention.

In the vehicle according to the embodiment of the present invention, it is assumed that the engine intermittent operation control, common in a so-called economy running system or in a hybrid vehicle, is carried out wherein engine 10 is temporarily stopped every time a prescribed engine stop condition is satisfied and it is automatically restarted in response to fulfillment of a reset condition of the engine stop condition.

An intermittent operation control unit 302# shown in FIG. 2 represents the functional block of engine ECU 300 of FIG. 1 related to the intermittent operation control. Intermittent operation control unit 302# receives signals necessary for determination of fulfillment of an engine stop condition and an engine stop reset condition, and generates an automatic stop (temporary stop) instruction and a restart instruction of the engine. Intermittent operation control unit 302# corresponds to the "intermittent operation control means" of the present invention.

Figure 3:
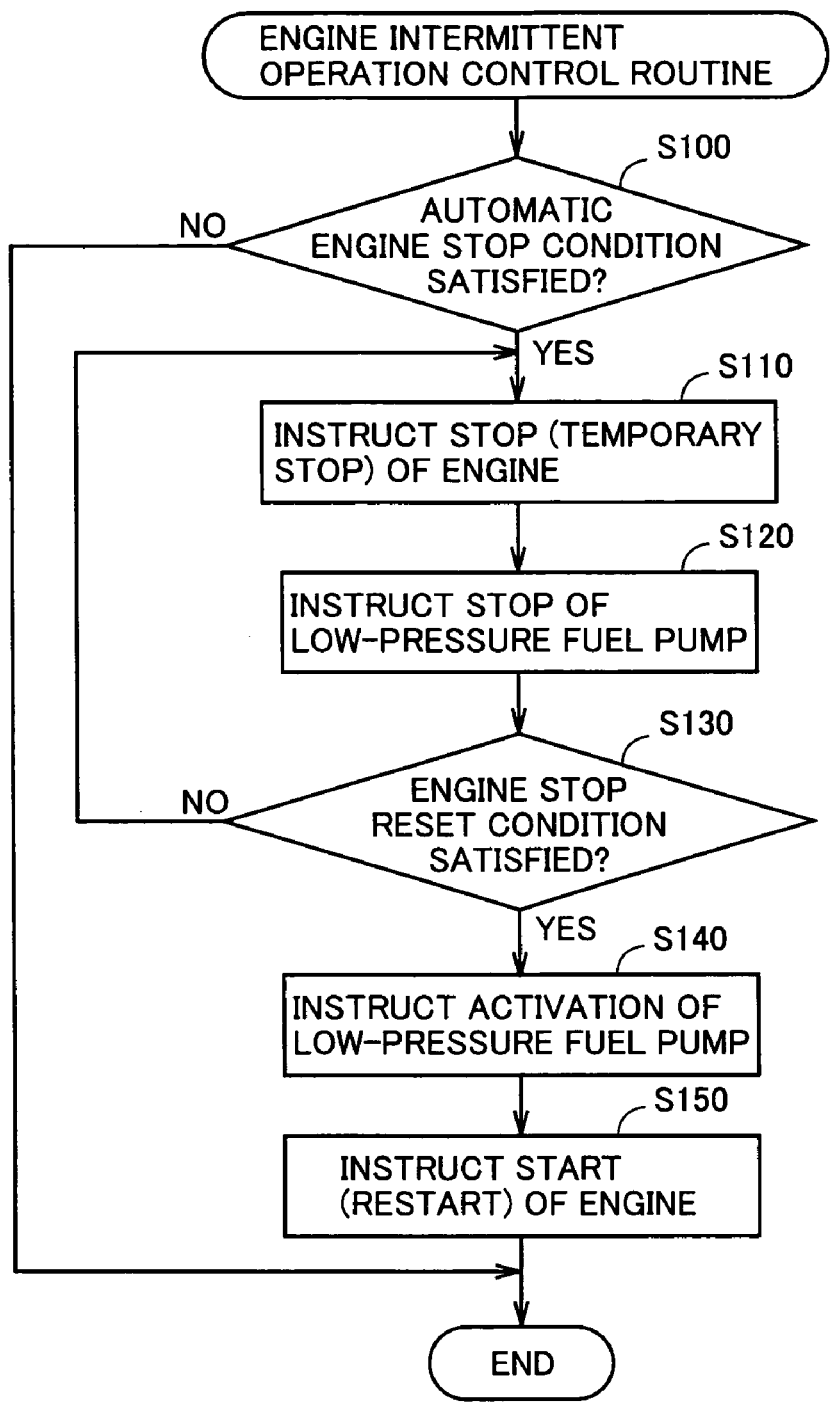
FIG. 3 is a flowchart illustrating engine intermittent operation control.

FIG. 3 is a flowchart illustrating the engine intermittent operation control carried out by intermittent operation control unit 302#.

Referring to FIG. 3, in step S100, intermittent operation control unit 302# determines whether a prescribed, automatic engine stop condition is satisfied. If not (NO in step S100), the operation of the engine is continued, and the engine intermittent operation control routine is terminated.

The above-described automatic engine stop condition is satisfied, e.g., when the state where the vehicle speed=0 and the accelerator press-down degree=0 continues for a predetermined period of time and three-way catalytic converter 90 has also been increased in temperature and thus activated.

If the automatic engine stop condition is satisfied (YES in step S100), intermittent operation control unit 302# issues a temporary stop instruction to engine 10 (step S110), and also outputs a stop instruction to low-pressure fuel pump 180 (step S120).

After the temporary stop of the engine, it is determined periodically whether an engine stop reset condition is satisfied (step S130). As long as the engine stop reset condition is not satisfied (NO in step S130), engine 10 and low-pressure fuel pump 180 remain temporarily stopped.

If the engine stop rest condition is satisfied (YES in step S130), intermittent operation control unit 302# issues a restart instruction to low-pressure fuel pump 180 (step S140), and also issues a restart instruction to engine 10 (step S150). The engine stop reset condition is fulfilled when the above-described automatic engine stop condition is no longer met, typically when the accelerator pedal is pressed down and thus the accelerator press-down degree≠0.

As described above, in the internal combustion engine according to the embodiment of the present invention shown in FIGS. 1 and 2, stop of engine 10 includes the following two cases: stop of the engine corresponding to the end of vehicle operation by turning off of the ignition key, and temporary stop of the engine assuming restart thereof by the engine intermittent operation control.

In the case of temporary stop of the engine according to the intermittent operation control, it is critical to quickly restart the fuel injection at the restart of the engine. On the other hand, in the case of stop of the engine associated with the end of vehicle operation, it is important to prevent degradation in oil tightness of in-cylinder injector 110 and intake manifold injector 120 during the period where vehicle operation is stopped. Thus, in the embodiment of the present invention, pressure release control, as will be described below, is carried out in the fuel supply system shown in FIG. 2.

Figure 4:
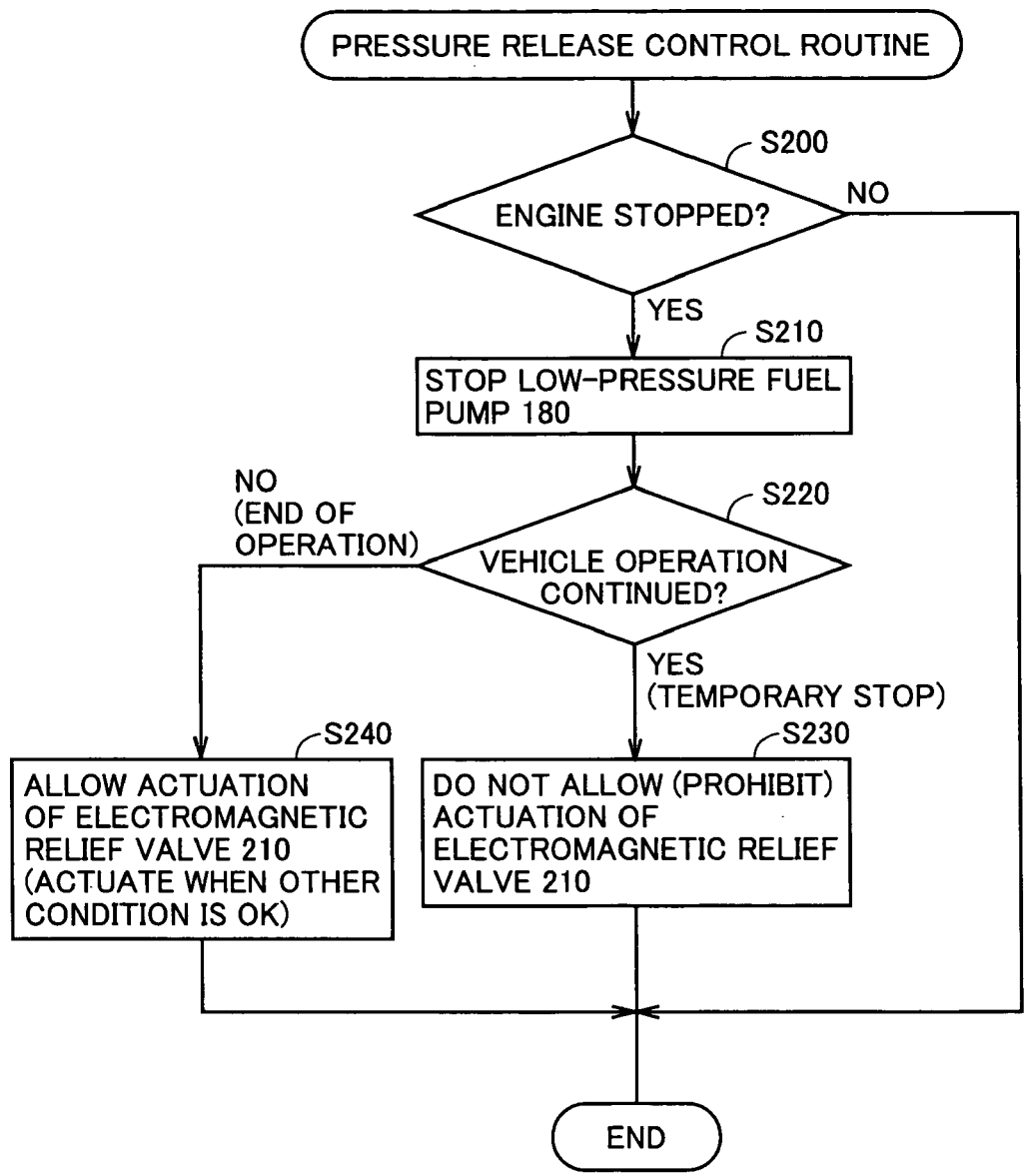
FIG. 4 is a flowchart illustrating pressure release control in the fuel supply system shown in FIG. 2 in the control apparatus according to the embodiment of the present invention.

Referring to FIG. 4, engine ECU 300 determines whether the engine is being stopped or not, by detecting an engine speed, for example (step S200). During the operation of the engine (NO in step S200), the pressure release control is unnecessary. Thus, the pressure release control routine is terminated, without performing the pressure release from the low-pressure fuel supply system (low-pressure delivery pipe 160) or from the high-pressure fuel supply system (high-pressure delivery pipe 130).

On the other hand, at the stop of the engine (YES in step S200), the operation of low-pressure fuel pump 180 is stopped (step S210). This decreases the fuel pressure of the low-pressure fuel supply system including low-pressure delivery pipe 160, as described in conjunction with FIG. 2.

At the stop of the engine, engine ECU 300 further determines whether the operation of the vehicle is being continued, to distinguish the temporary stop of the engine by the engine intermittent operation control from the stop of the engine associated with the end of vehicle operation (step S220).

For example, if the ignition key is not turned off, it is determined that it is the temporary stop of the engine with the vehicle operation being continued. During the temporary stop of the engine (YES in step S220), actuation (opening) of electromagnetic relief valve 210 is not allowed (or, is prohibited) (step S230) so as to quickly secure the fuel pressure required for restart of the engine.

On the other hand, if the ignition key is off, it is recognized to be the stop of the engine associated with the end of vehicle operation. At the stop of the engine associated with the end of vehicle operation (NO in step S220), actuation of electromagnetic relief valve 210 is allowed (step S240) so as not to cause deterioration in emission performance at the time of next start of the engine due to leakage of the fuel because of degradation in oil tightness of injectors 110, 120 during the vehicle operation stop period. At the stop of the engine associated with the end of vehicle operation, if another prescribed condition is further satisfied, the fuel pressure in the high-pressure fuel supply system including high-pressure delivery pip 130 is decreased by actuation of electromagnetic relief valve 210. This permits release of the fuel pressure from both of the low-pressure fuel supply system and the high-pressure fuel supply system, so that degradation of oil tightness during the vehicle operation stop period can be prevented.

Figure 5:
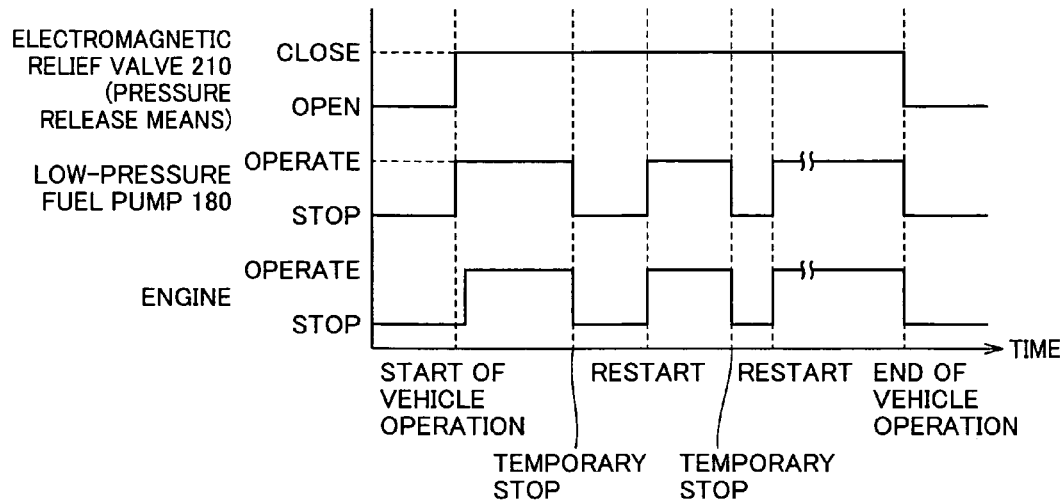
FIGS. 5 and 6 are operational waveform diagrams illustrating operations of the fuel supply system according to the pressure release control shown in FIG. 4.

With the pressure release control as in FIG. 4, the operations of electromagnetic relief valve 210 and low-pressure fuel pump 180 of the internal combustion engine according to the embodiment of the present invention are controlled as shown in FIG. 5.

Referring to FIG. 5, at the start of vehicle operation corresponding to turning on of the ignition key, electromagnetic relief valve 210 is changed from the open state to the closed state. Further, operation of low-pressure fuel pump 180 is started, and the fuel pressure in the low-pressure fuel supply system begins to increase toward a necessary level. At the start of vehicle operation, the timing of starting engine 10 is set at the time point when the fuel pressure of a required level is guaranteed in the low-pressure fuel supply system by operation of low-pressure fuel pump 180.

At the temporary stop of the engine according to the engine intermittent operation control (FIG. 3), operation of low-pressure fuel pump 180 is also stopped. Stopping the operation of low-pressure fuel pump 180 during the time period where fuel injection is unnecessary can improve fuel efficiency by reduction of consumed power. Meanwhile, electromagnetic relief valve 210 remains closed, of which actuation is not allowed.

At the stop of the engine associated with the end of vehicle operation corresponding to turning off of the ignition key, operation of low-pressure fuel pump 180 is stopped, and electromagnetic relief valve 210 is actuated and opened as well. Consequently, the fuel pressure in the low-pressure fuel system (particularly, low-pressure delivery pipe 160) as well as in the high-pressure fuel supply system (particularly, high-pressure delivery pipe 130) decreases, and thus, degradation of oil tightness during the vehicle operation stop period is prevented.

Immediately after the end of vehicle operation, the temperature of the fuel in high-pressure delivery pipe 130 is likely to be high. If electromagnetic relief valve 210 is opened in this state to rapidly decrease the pressure, vapor lock may occur in the fuel supply system due to boiling under reduced pressure.

Figure 6:
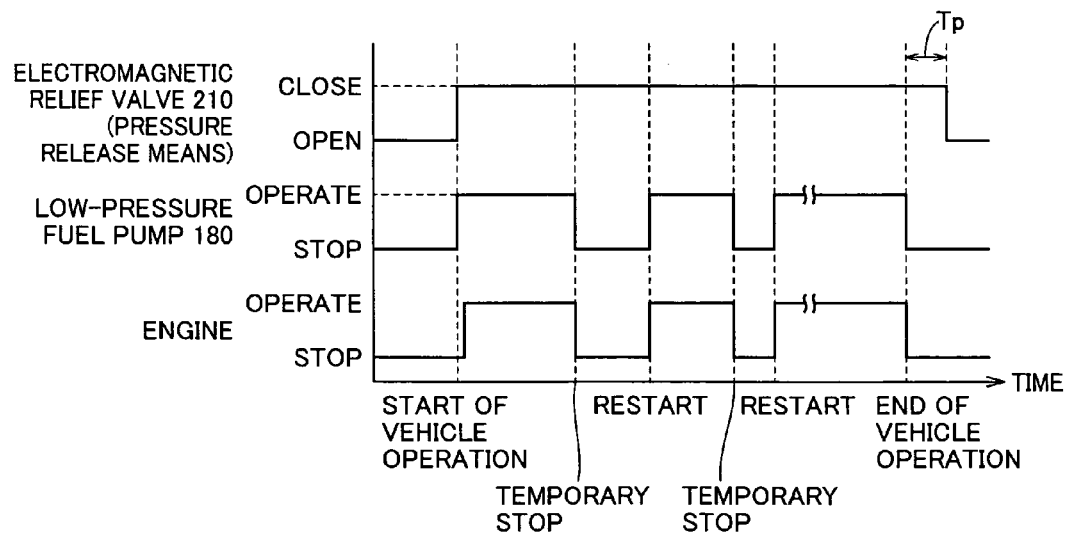

Thus, as shown in FIG. 6, the timing for actuating (opening) electromagnetic relief valve 210 at the time of engine stop associated with the end of vehicle operation may be set at a time point a predetermined time Tp after the end of vehicle operation. The predetermined time Tp is set to guarantee a period of time during which the temperature of the fuel in high-pressure delivery pipe 130 is decreased to the level that can prevent such boiling under reduced pressure.

In the configuration of the fuel supply system shown in FIG. 2, low-pressure delivery pipe 160 is arranged upstream of fuel pressure regulator 170. Thus, it is difficult to secure a fuel pressure of a required level in low-pressure delivery pipe 160 at the time of restart following temporary stop of the engine, hindering normal fuel injection from intake manifold injectors 120 upon the engine restart. Meanwhile, electromagnetic relief valve 210 is maintained in the closed state even during the temporary stop of the engine, and therefore, the fuel pressure in high-pressure delivery pipe 130 for delivering the fuel into in-cylinder injectors 110 is maintained at a required level. Thus, fuel injection using in-cylinder injectors 110 can be performed normally even at the restart of the engine.

Figure 7:
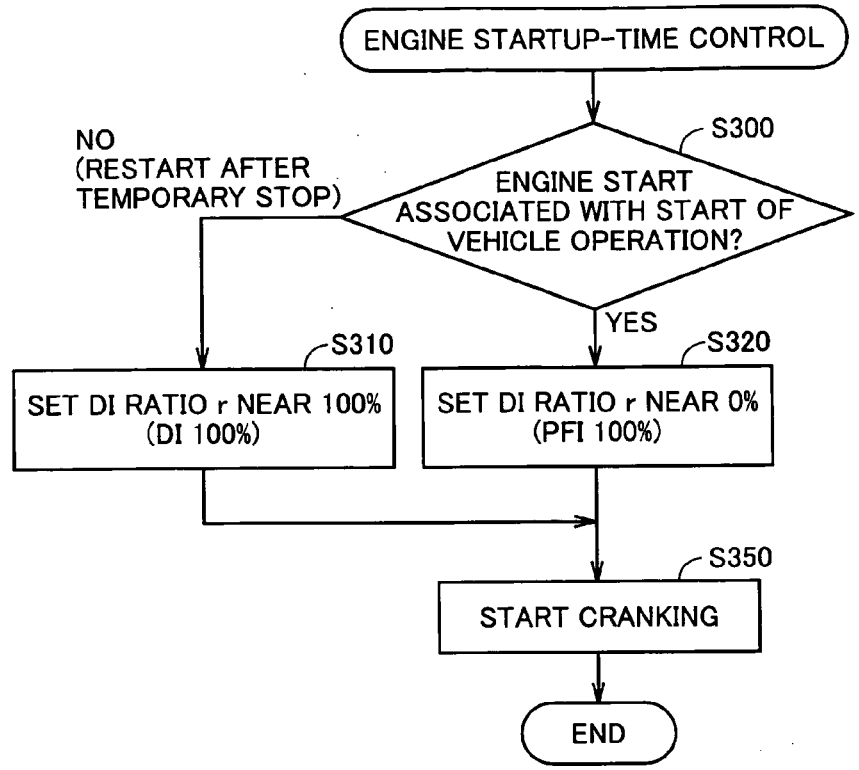
FIG. 7 is a flowchart illustrating engine startup-time control by the control apparatus according to the embodiment of the present invention.

Taking into consideration the above-described points, in the internal combustion engine according to the embodiment of the present invention, the engine startup-time control as shown in FIG. 7 is carried out.

Referring to FIG. 7, at the start of the engine, engine ECU 300 determines whether the relevant engine start is the one associated with start of vehicle operation. If it is not the engine start associated with start of vehicle operation, i.e., if it is not the initial engine start following turning on of the ignition key, then it is determined to be restart of the engine by the engine intermittent operation control. As described above, at the restart of the engine, while it is difficult to quickly increase the fuel pressure in low-pressure delivery pipe 160 because low-pressure fuel pump 180 is being stopped, the fuel pressure in high-pressure delivery pipe 130 is maintained at a certain level because electromagnetic relief valve 210 is kept closed.

Thus, at the restart of the engine (NO in step S300), engine ECU 300 sets the DI ratio r near 100% (step S310) such that the fuel of almost all of the total fuel injection quantity required is injected via in-cylinder injector 110, and then starts cranking (step S350). Herein, the DI ratio r refers to a ratio of the quantity of the fuel injected from in-cylinder injector 110 to a total quantity of the fuel injected from both in-cylinder injector 110 and intake manifold injector 120.

Generally, in the cold state of the internal combustion engine, atomization of the fuel within the cylinder would not be promoted, and the fuel injected from in-cylinder injector 110 tends to adhere to the top face of the engine piston (piston top face) or the inner peripheral surface of the cylinder (cylinder inner face (bore)) in a great quantity. Of the fuel thus adhered, particularly the fuel adhered to the piston top face will be gradually atomized during the subsequent engine combustion process, and discharged from the cylinder in the state of imperfect combustion. This will cause generation of black smoke, increase of unburned components and the like, leading to deterioration in emission performance. Further, the fuel adhered to the cylinder inner face will be mixed with the lubricant applied to the cylinder inner face for lubrication of the engine piston, thereby impairing the lubrication property of the internal combustion engine.

At the temporary stop as well as at the restart of engine 10 by the engine intermittent operation control shown in FIG. 3, however, the temperature inside engine 10, or, in the combustion chamber, has been increased. Three-way catalytic converter 90 has also been increased in temperature and thus activated, so that there is only a small possibility that in-cylinder fuel injection would cause the above-described adverse effect. Accordingly, in the fuel supply system shown in FIG. 2, the restart of the engine by the engine intermittent operation control is effected with the in-cylinder fuel injection, whereby quick starting capability is secured and deterioration in emission performance is also prevented.

In the case of engine start associated with start of vehicle operation (YES in step S300), the engine needs to be started in the engine cold state. Thus, it is necessary to avoid the inconvenience of the in-cylinder fuel injection as described above. Accordingly, engine ECU 300 sets DI ratio r near 0% (i.e., PFI (Port Fuel Injection) ratio near 100%) (step S320) such that the fuel of almost all of the total fuel injection quantity required is to be injected from intake manifold injector 120, and starts cranking (step S350). In this manner, it is possible to prevent deterioration in emission performance at the time of engine start associated with start of vehicle operation.

Step S310 in the flowchart of FIG. 7 corresponds to the "first startup-time injection control means" and step S320 corresponds to the "second startup-time injection control means" of the present invention. Further, the functional part of engine ECU 300 controlling the DI ratio corresponds to the "fuel injection control means" of the present invention.

Hereinafter, preferable engine startup-time control when the engine system shown in FIGS. 1 and 2 is incorporated into a hybrid vehicle will be described.

Firstly, a schematic configuration of a hybrid vehicle will be explained with reference to FIG. 8.

Figure 8:
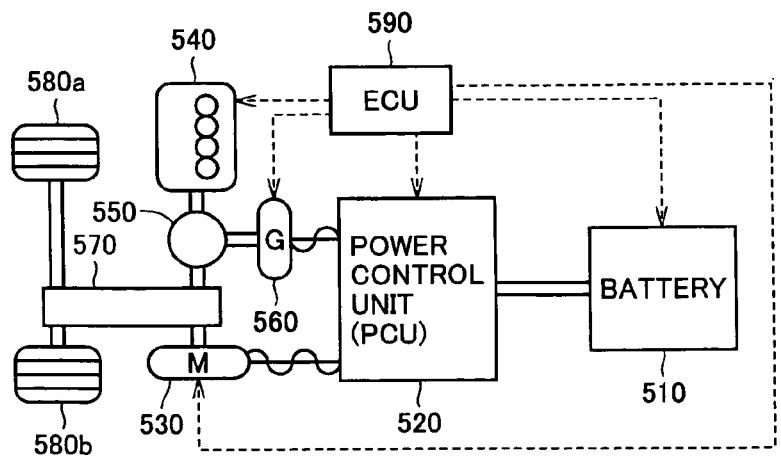
FIG. 8 is a block diagram showing a schematic configuration of a hybrid vehicle.

Referring to FIG. 8, the hybrid vehicle 500 includes, in addition to an engine 540, a battery 510, a power control unit (PCU) 520 for converting power, an electric motor 530, a power split mechanism 550, a power generator (generator) 560, a reduction gear 570, driving wheels 580a, 580b, and a hybrid ECU 590 that controls an overall operation of hybrid vehicle 500.

Although a hybrid vehicle of which only the front wheels are the driving wheels is shown in FIG. 8, another electric motor for driving the rear wheels may be provided to implement a 4-WD hybrid vehicle.

Battery 510 is configured with a rechargeable secondary battery (of nickel hydrogen or lithium ion, for example). PCU 520 includes an inverter (not shown) for converting a direct-current (DC) voltage supplied from battery 510 to an alternating-current (AC) voltage for driving electric motor 530. The inverter is configured to perform power conversion in both directions, and also has a function of converting the power (AC voltage) generated by the regenerative braking operation of electric motor 530 as well as the power (AC voltage) generated by generator 560 to a DC voltage for charging battery 510.

Further, PCU 520 may also include a step up-and-down converter (not shown) to perform level conversion of the DC voltage. Provision of such a step up-and-down converter makes it possible to drive electric motor 530 by an AC voltage having the amplitude of higher voltage than the supply voltage of battery 510, which can improve motor driving efficiency.

As engine 540, the engine system shown in FIG. 1, for example, is applied. Power split mechanism 550 can split the driving force generated by the engine into two parts and deliver them to the path for transmission to driving wheels 580a, 580b via reduction gear 570, and to the path for transmission to generator 560. Generator 560 is rotated by the driving force from engine 540 transmitted via power split mechanism 550, to generate power. The electric power generated by generator 560 is used by PCU 520, as the charging power of battery 510, or as the driving power of electric motor 530.

Electric motor 530 is rotated and driven by the AC voltage supplied from PCU 520. The driving force of electric motor 530 is transmitted via reduction gear 570 to driving wheels 580a, 580b, to serve as the vehicle driving force. That is, electric motor 530 corresponds to the "other driving force source" in the present invention. In the regenerative braking operation in which electric motor 530 is rotated with reduction in speed of driving wheels 580a, 580b, electric motor 530 functions as a power generator.

The start of vehicle operation in the hybrid vehicle corresponds to activation of the hybrid system, i.e., the state where battery 510 identified as the power source for driving the wheels is connected to electric motor 530 to enable running by electric motor 530. Meanwhile, the stop of vehicle operation in the hybrid vehicle corresponds to stop of the hybrid system, i.e., the state where battery 510 being the high-pressure power source for driving the wheels is disconnected from electric motor 530.

Hybrid vehicle 500, at the time of light load when starting moving or driving at low speed or climbing a moderate slope, runs with the driving force of electric motor 530, rather than the driving force of engine 540, to avoid the low-efficiency region of the engine. As such, operation of engine 540 is stopped unless warm-up operation is necessary. When such warm-up operation is required, engine 540 is operated at idle.

In the normal running, engine 540 is started, and the driving force output from engine 540 is split by power split mechanism 550 into the driving force of driving wheels 580a, 580b and the driving force for generating power in generator 560. The power generated by generator 560 is used to drive electric motor 530. Thus, during the normal running, the driving force by electric motor 530 assists the driving force by engine 540 to drive driving wheels 580a, 580b. Hybrid ECU 590 controls the power splitting ratio by power split mechanism 550 such that the overall efficiency becomes maximum. Further, at full acceleration, the power supplied from battery 510 is further used for driving electric motor 530, so that the force for driving the driving wheels 580a, 580b further increases.

Upon speed reduction and braking, electric motor 530 is rotated and driven by driving wheels 580a, 580b, to generate power. The electric power collected by regenerative power generation of electric motor 530 is converted to a DC voltage by PCU 520, and used for charging battery 510. At the time of stop of the vehicle, engine 540 is automatically stopped.

As described above, hybrid vehicle 500 achieves vehicle operation improved in fuel efficiency, by combination of the driving force generated by engine 540 and the driving force generated by electric motor 530 using electric energy as a source, that is, by controlling the operations of engine 540 and electric motor 530 according to the state of the vehicle. Specifically, hybrid ECU 590 controls the ratio of the driving force generated by electric motor 530 and engine 540 in accordance with the operation state.

Accordingly, in the hybrid vehicle, the driving force by engine 540 is not immediately necessary at the time of start of vehicle operation. Thus, it is possible to carry out the engine startup-time control as described below to quickly increase the fuel pressure in low-pressure delivery pipe 160 and in high-pressure delivery pipe 130 for preparation of start of operation of the internal combustion engine.

Figure 9:
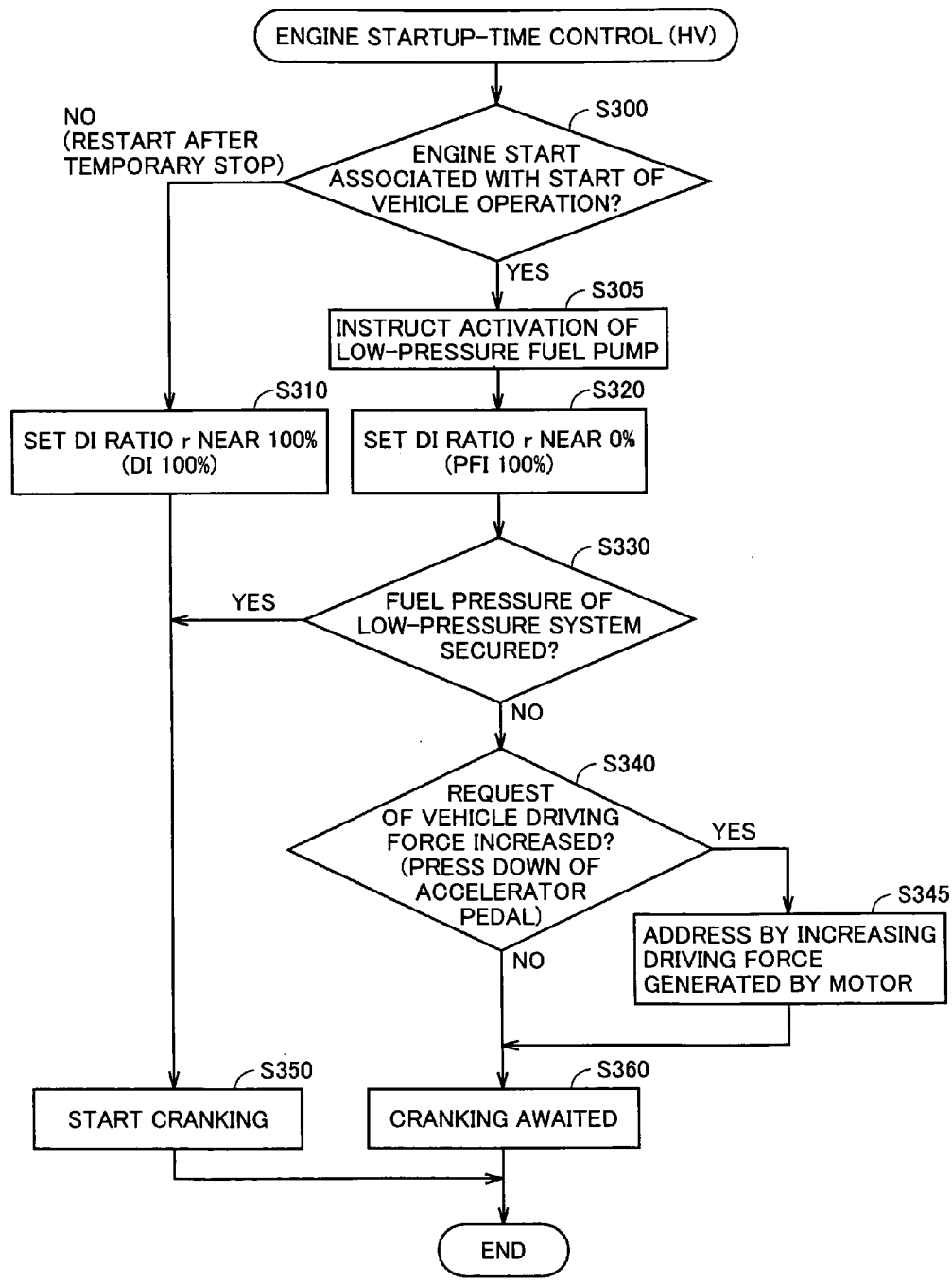
FIG. 9 is a flowchart illustrating the engine startup-time control in the hybrid vehicle shown in FIG. 8.

Referring to FIG. 9, in the engine startup-time control of the hybrid vehicle, engine ECU 300 determines whether the engine start corresponds to the one associated with start of vehicle operation or it corresponds to the engine restart by the engine intermittent operation control, by execution of step S300 that is similar to step S300 in FIG. 7.

In the case of the engine start associated with start of vehicle operation (YES in step S300), engine ECU 300 issues an activation instruction of low-pressure fuel pump 180 (step S305), prior to issuance of a starting instruction of engine 10.

Further, engine ECU 300 performs step S320 similar to that of FIG. 7, to set DI ratio r near 0% such that the engine start in the engine cold state is carried out by fuel injection via intake manifold injector 120.

Further, in step S330, engine ECU 300 determines whether a fuel pressure of a required level is guaranteed in the low-pressure fuel supply system by activation of low-pressure fuel pump 180 in step S305. If so (YES in step S330), cranking is started (step S350) at the DI ratio (r≈0%) having been set in step S320.

If a necessary fuel pressure is not secured in the low-pressure fuel supply system (NO in step S330), cranking is awaited (step S360). Further, while cranking is being awaited, if the request of the vehicle driving force is increased by press-down of the accelerator pedal or the like (YES in step S340), then hybrid ECU 590 sets an output torque command value such that the driving force generated by electric motor (motor) 530 increases corresponding to the increase of the requested driving force (step S345).

At the engine restart by the engine intermittent operation control, step S310 similar to that of FIG. 7 is carried out to set DI ratio r near 100% such that the fuel of almost all of the total fuel injection quantity required is injected from in-cylinder injector 110, and then cranking is started (step S350).

In the hybrid vehicle, at the time of engine start in the engine cold state associated with start of vehicle operation, an operation instruction of low-pressure fuel pump 180 is issued prior to the engine start. This allows fuel pressure of a required level for the fuel injected from intake manifold injector 120 to be secured more quickly, so that smooth engine start is achieved. Further, during the time period where engine start cannot be done with intake manifold injection due to an insufficient fuel pressure or the like, the driving force generated by electric motor 530 can be employed to address the increase of the vehicle driving force requested by the driver, so that starting capability of the vehicle can be guaranteed.

As described above, the fuel supply system shown in FIG. 2 is capable of releasing pressure in each of the high-pressure fuel system and the low-pressure fuel system, and accordingly, it is possible to apply the pressure release control as well as the engine startup-time control of the embodiment of the present invention to secure smooth starting capability and to prevent deterioration in emission performance.

(Other Configuration Example of Fuel Supply System)

Hereinafter, another configuration example of the fuel supply system for the internal combustion engine according to the embodiment of the present invention will be described.

Figure 10:
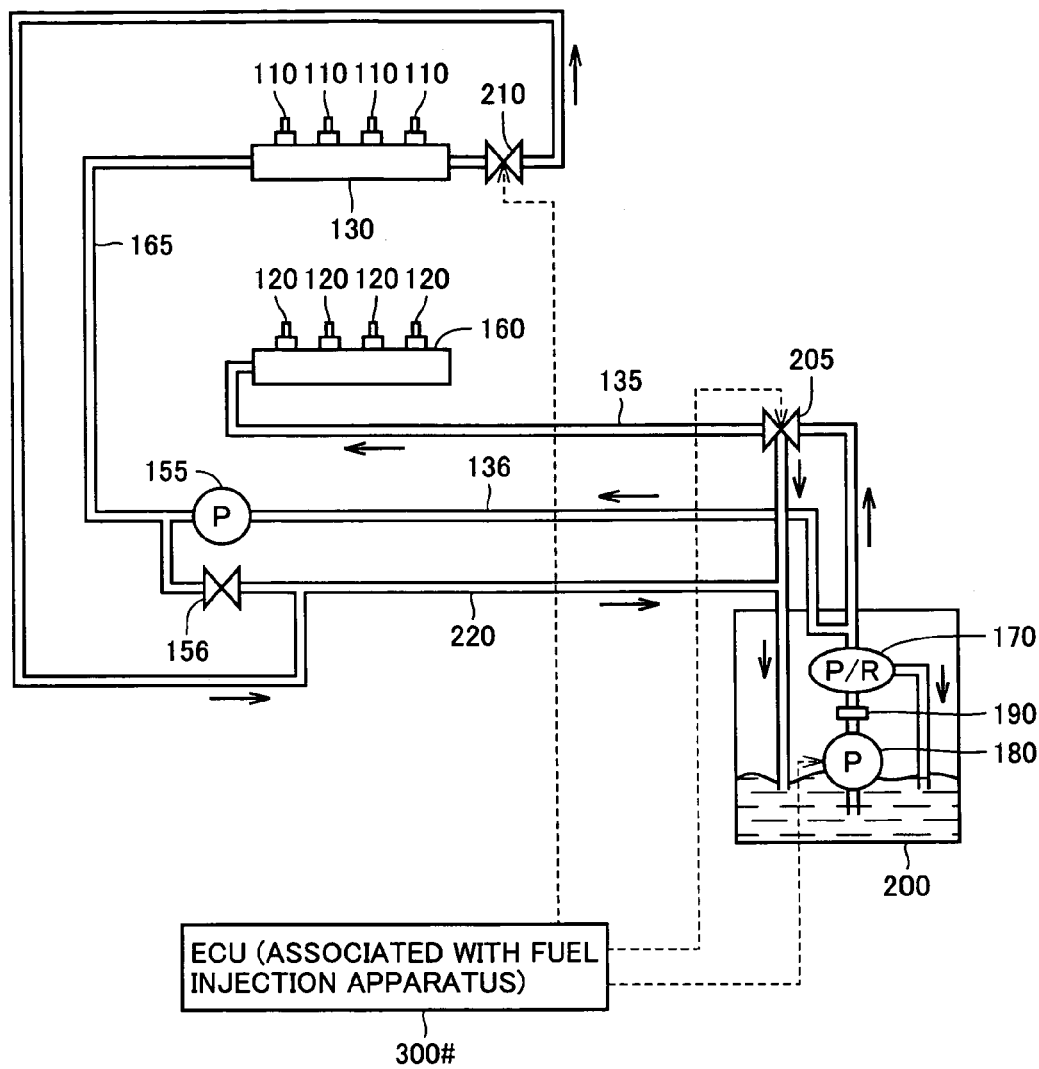
FIG. 10 illustrates another configuration example of the fuel supply system shown in FIG. 1.

Referring to FIG. 10, the fuel supply system of the other configuration example differs from the fuel supply system shown in FIG. 2 in that the fuel discharged from low-pressure fuel pump 180 and passed through fuel pressure regulator 170 is guided to branched paths of one directed to low-pressure delivery pipe 160 and the other directed to high-pressure delivery pipe 130.

The fuel discharged from low-pressure fuel pump 180 of the electric motor-driven type is supplied via fuel filter 190 to fuel pressure regulator 170. Fuel pressure regulator 170 is arranged upstream of low-pressure delivery pipe 160, and is configured to return a part of the fuel discharged from low-pressure fuel pump 180 back to fuel tank 200 when the fuel pressure of the discharged fuel becomes greater than a preset fuel pressure. This ensures that the fuel pressure on the downstream side of fuel pressure regulator 170 is maintained at the preset fuel pressure or lower.

On the downstream side of fuel pressure regulator 170, branched fuel pipes 135 and 136 are provided. The fuel discharged from low-pressure fuel pump 180 and passed through fuel pressure regulator 170 is delivered via fuel pipe 135 to low-pressure delivery pipe 160. An electromagnetic relief valve 205 is provided in a fuel path extending from fuel pressure regulator 170 to low-pressure delivery pipe 160, at a certain position of fuel pipe 135.

When the fuel pressure in fuel pipe 135 becomes greater than a prescribed pressure, electromagnetic relief valve 205 forms a path for guiding a part of the fuel to fuel return pipe 220. It is actuated (opened) in response to a control signal from ECU 300# to form a path extending from fuel pipe 135 to fuel return pipe 220 so as to lower the fuel pressure in low-pressure delivery pipe 160 and in fuel pipe 135.

Fuel pipe 136 is connected to the intake side of high-pressure fuel pump 155. An electromagnetic spill valve 156 is provided on the discharge side of high-pressure fuel pump 155. The discharge side of high-pressure fuel pump 155 is connected via fuel pipe 165 to high-pressure delivery pipe 130.

Further, on the downstream side of high-pressure delivery pipe 130, an electromagnetic relief valve 210 is arranged between the pipe 130 and fuel return pipe 220, as in the configuration example of FIG. 2.

In the configuration of the fuel supply system shown in FIG. 10, the pressure of the low-pressure fuel supply system (particularly, low-pressure delivery pipe 160) cannot be released by stopping low-pressure fuel pump 180. Thus, electromagnetic relief valve 205 serving as the pressure release means of the low-pressure fuel supply system is additionally provided.

In the fuel supply system shown in FIG. 10, electromagnetic relief valve 205 corresponds to the "second pressure release means" of the present invention.

In the fuel supply system shown in FIG. 10, the pressure release control similar to that in FIG. 4 is carried out, by making the timing of actuation of electromagnetic relief valve 205 similar to that of electromagnetic relief valve 210. As a result, the operation of the fuel supply system shown in FIG. 10 becomes as shown in FIG. 11.

Figure 11:
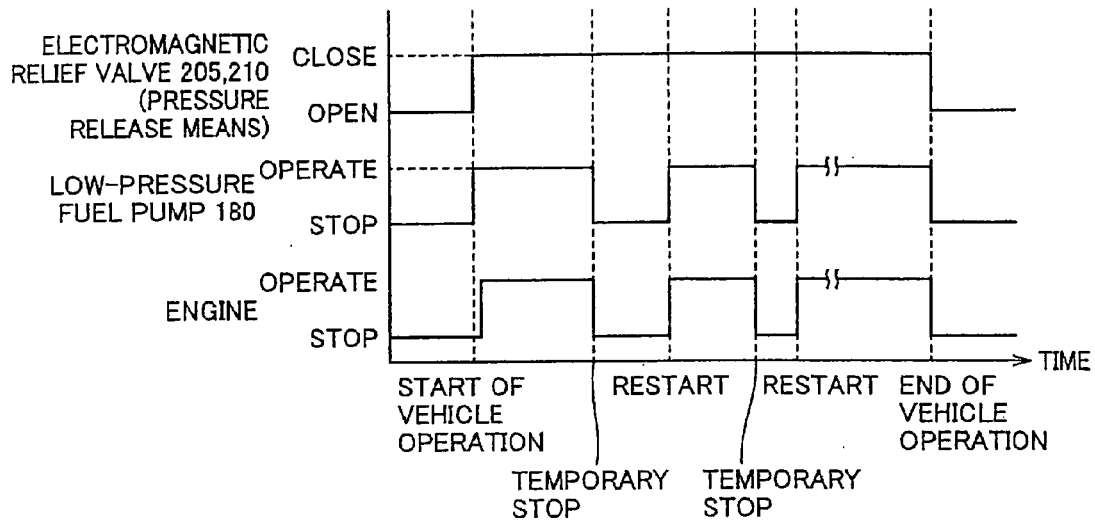
FIGS. 11 and 12 are operational waveform diagrams illustrating operations of the fuel supply system shown in FIG. 10.

Referring to FIG. 11, low-pressure fuel pump 180 is operated in synchronization with the operating period of engine 10, as in the case shown in FIG. 5. That is, low-pressure fuel pump 180 is stopped while engine 10 is temporarily stopped.

Electromagnetic relief valves 205 and 210 are controlled in the same manner as electromagnetic relief valve 205 of FIG. 5, to be closed in response to start of vehicle operation and to be actuated (opened) in response to end of vehicle operation. That is, during the temporary stop period of engine 10, actuation of electromagnetic relief valves 205 and 210 is prohibited and they are maintained in the closed state.

As such, in the fuel supply system shown in FIG. 10, at the time of stop of vehicle operation, the fuel pressure in high-pressure delivery pipe 130 (high-pressure fuel supply system) is decreased by actuation (opening) of electromagnetic relief valve 210, and the fuel pressure in low-pressure delivery pipe 160 (low-pressure fuel supply system)

arranged downstream of fuel pressure regulator 170 is also decreased sufficiently by actuation (opening) of electromagnetic relief valve 205. Accordingly, as in the case of the fuel injection system shown in FIG. 2, it is possible to suppress leakage of the fuel attributable to degradation in oil tightness of in-cylinder injectors 110 and intake manifold injectors 120 during the stop of vehicle operation, to thereby prevent deterioration in emission performance upon engine start at the next start of vehicle operation.

The engine startup-time control in the vehicle provided with the engine system (internal combustion engine) having the fuel supply system shown in FIG. 10 can be carried out according to FIG. 7 or FIG. 9 (hybrid vehicle). In the fuel injection system shown in FIG. 10, during the temporary stop period of engine 10 by the engine intermittent operation control, both of electromagnetic relief valves 205 and 210 remain closed, which can maintain the required fuel pressure at both of the high-pressure fuel supply system (high-pressure delivery pipe 130) and the low-pressure fuel supply system (low-pressure delivery pipe 160). Accordingly, at the time of engine restart, both of in-cylinder injector 110 and intake manifold injector 120 are ready to inject the fuel.

Taking the above-described point into consideration, at the time of setting the DI ratio (step S310 in FIGS. 7 and 9) upon restart after temporary stop of the engine, the DI ratio can be set according to the temperature of the engine, rather than being set near 100%. More specifically, when the temperature of the engine is low (in the engine cold state), the DI ratio may be set near 0% to inject the fuel of almost all of the total fuel injection quantity from intake manifold injector 120, so as to prevent adhesion of the fuel to the cylinder and the piston. When the engine is sufficiently warm, the DI ratio may be set corresponding to the engine condition to allow fuel injection from in-cylinder injector 110 as well, to quickly ensure required power output. Alternatively, the DI ratio of the intermediate range may be set depending on the situations.

Figure 12:
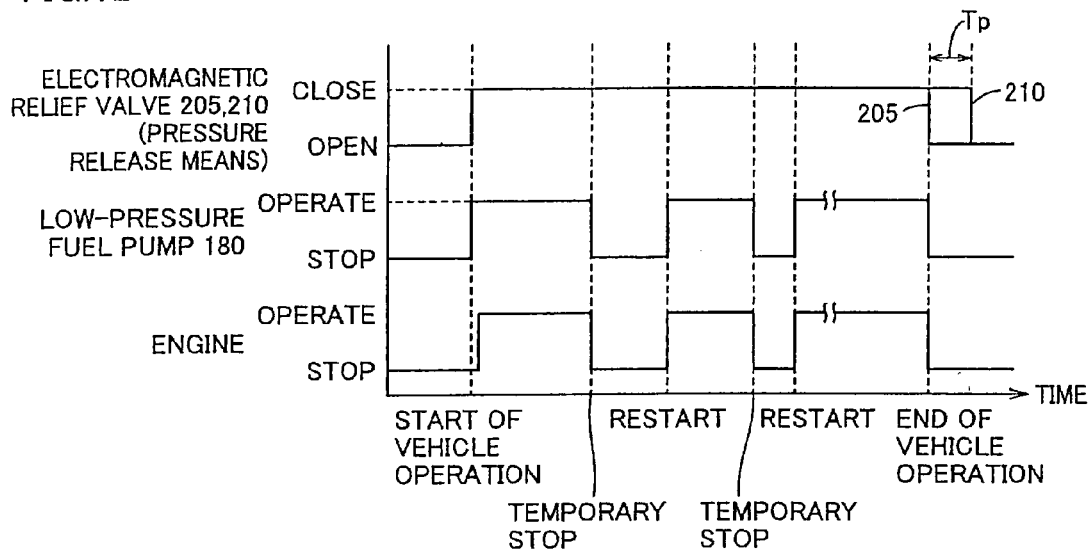

Further, as shown in FIG. 12, in the fuel supply system shown in FIG. 10 as well, the timing of actuation (opening) of electromagnetic relief valves 205, 210 at the time of engine stop associated with end of vehicle operation may be set at a time point a predetermined time Tp after the end of vehicle operation, so as to prevent vapor lock that would occur when the pressure is rapidly lowered while the fuel temperature is still high.

As described above, in the fuel supply system of FIG. 10 as well, it is possible to release the fuel pressure in both of the high-pressure fuel system and the low-pressure fuel system, so that smooth starting capability can be secured and deterioration in emission performance can be prevented by applying the pressure release control and the engine startup-time control of the embodiment of the present invention.

(Preferable DI Ratio Setting in Normal Operation)

Hereinafter, a first example of preferable setting of a DI ratio in a normal operation of the internal combustion engine according to the embodiment of the present invention will be described.

Figure 13:
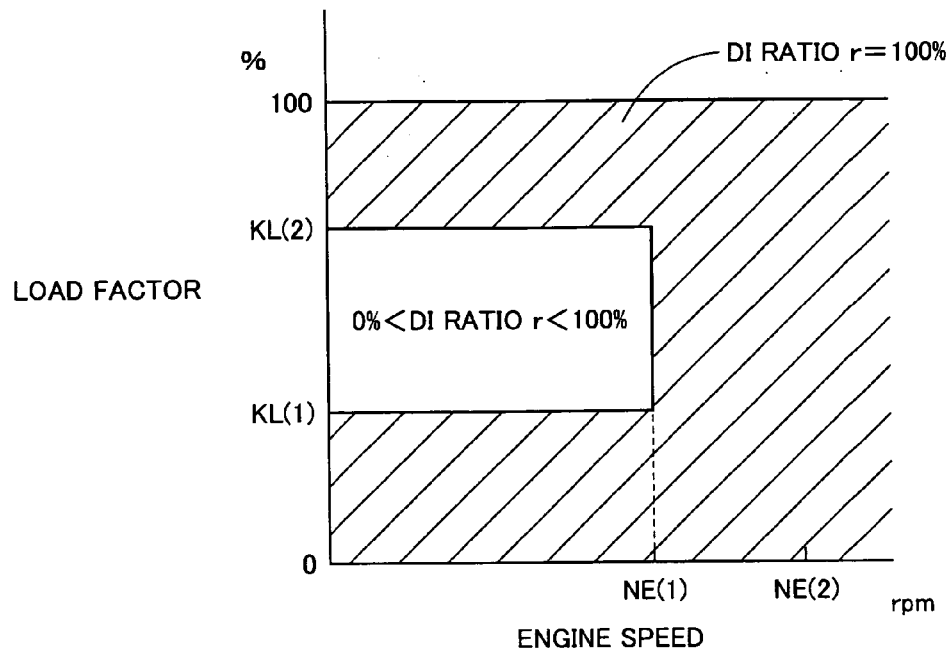
FIGS. 13 and 14 illustrate a first example of DI ratio setting maps (in the engine warm state and the engine cold state, respectively) in the engine system shown in FIG. 1.
Figure 14:
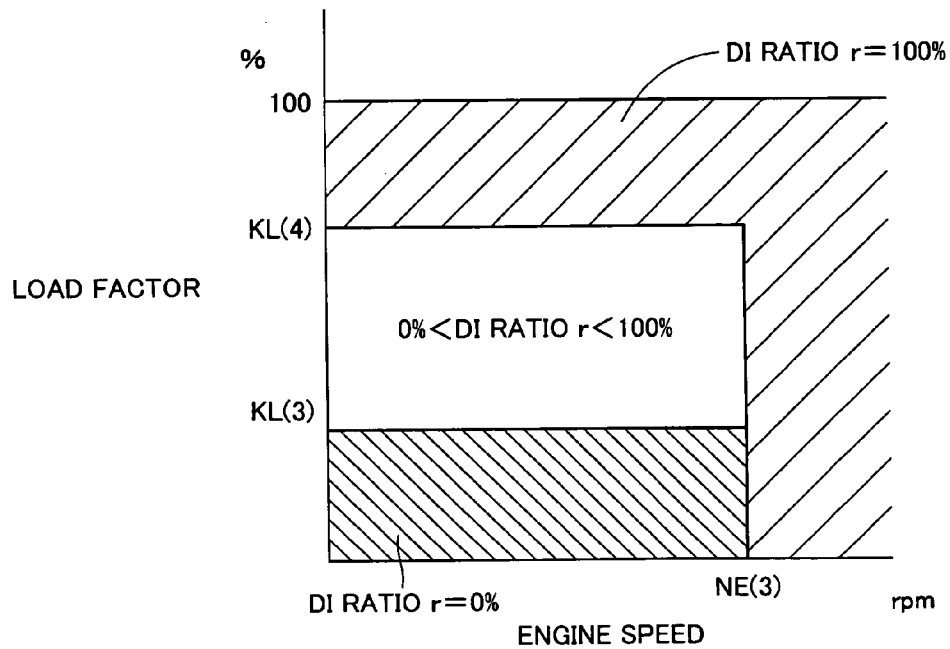

Referring to FIGS. 13 and 14, maps each indicating a fuel injection ratio between in-cylinder injector 110 and intake manifold injector 120, identified as information associated with an operation state of engine 10, will now be described. Herein, the fuel injection ratio between the two injectors is also expressed as a ratio of the quantity of the fuel injected from in-cylinder injector 110 to the total quantity of the fuel injected, which is referred to as the "fuel injection ratio of in-cylinder injector 110", or a "DI (Direct Injection) ratio (r)". The maps are stored in ROM 320 of engine ECU 300.

FIG. 13 is the map for a warm state of engine 10, and FIG. 14 is the map for a cold state of engine 10.

In the maps illustrated in FIGS. 13 and 14, with the horizontal axis representing an engine speed of engine 10 and the vertical axis representing a load factor, the fuel injection ratio of in-cylinder injector 110, or the DI ratio r, is expressed in percentage.

As shown in FIGS. 13 and 14, the DI ratio r is set for each operation region that is determine by the engine speed and the load factor of engine 10. "DI RATIO r=100%" represents the region where fuel injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state at idle).

Further, as shown in FIGS. 13 and 14, the fuel injection ratio between in-cylinder injector 110 and intake manifold injector 120, or, the DI ratio r, is defined individually in the map for the warm state and in the map for the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 13 is selected; otherwise, the map for the cold state shown in FIG. 14 is selected. One or both of in-cylinder injector 110 and intake manifold injector 120 are controlled based on the selected map and according to the engine speed and the load factor of engine 10.

The engine speed and the load factor of engine 10 set in FIGS. 13 and 14 will now be described. In FIG. 13, NE(1) is set to 2500 rpm to 2700 rpm, KL(1) is set to 30% to 50%, and KL(2) is set to 60% to 90%. In FIG. 14, NE(3) is set to 2900 rpm to 3100 rpm. That is, NE(1)<NE(3). NE(2) in FIG. 13 as well as KL(3) and KL(4) in FIG. 14 are also set as appropriate.

When comparing FIG. 13 and FIG. 14, NE(3) of the map for the cold state shown in FIG. 14 is greater than NE(1) of the map for the warm state shown in FIG. 13. This shows that, as the temperature of engine 10 is lower, the control region of intake manifold injector 120 is expanded to include the region of higher engine speed. That is, in the case where engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 13 and FIG. 14, "DI RATIO r=100%" holds in the region where the engine speed of engine 10 is NE(1) or higher in the map for the warm state, and in the region where the engine speed is NE(3) or higher in the map for the cold state. In terms of load factor, "DI RATIO r=100%" holds in the region where the load factor is KL(2) or greater in the map for the warm state, and in the region where the load factor is KL(4) or greater in the map for the cold state. This means that in-cylinder injector 110 alone is used in the region of a predetermined high engine speed, as well as in the region of a predetermined high engine load. That is, in the high speed region or the high load region, even if fuel injection is carried out using only in-cylinder injector 110, the engine speed and the load of engine IO are high, ensuring a sufficient intake air quantity, so that it is readily possible to obtain a homogeneous air-fuel mixture using in-cylinder injector 110 alone. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 13, fuel injection is also carried out using only in-cylinder injector 110 when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 10 may be prevented while ensuring the minimum fuel injection quantity thereof Thus, in-cylinder injector 10 alone is used in the relevant region.

When comparing FIG. 13 and FIG. 14, there is a region of "DI RATIO r=0%" only in the map for the cold state in FIG. 14. This shows that fuel injection is carried out using only intake manifold injector 120 in a predetermined low load region (KL(3) or less) when the temperature of engine 10 is low. When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high power output using in-cylinder injector 110 is unnecessary. Accordingly, fuel injection is carried out using intake manifold injector 120 alone, rather than using in-cylinder injector 110, in the relevant region.

Further, in an operation other than the normal operation, i.e., in the catalyst warm-up state at idle of engine 10 (abnormal operation state), in-cylinder injector 110 is controlled to carry out stratified charge combustion. By causing the stratified charge combustion during the catalyst warm-up operation, warming up of the catalyst is promoted, and exhaust emission is thus improved.

Hereinafter, a second example of the DI ratio in the normal operation of the internal combustion engine according to the embodiment of the present invention will be described.

Figure 15:
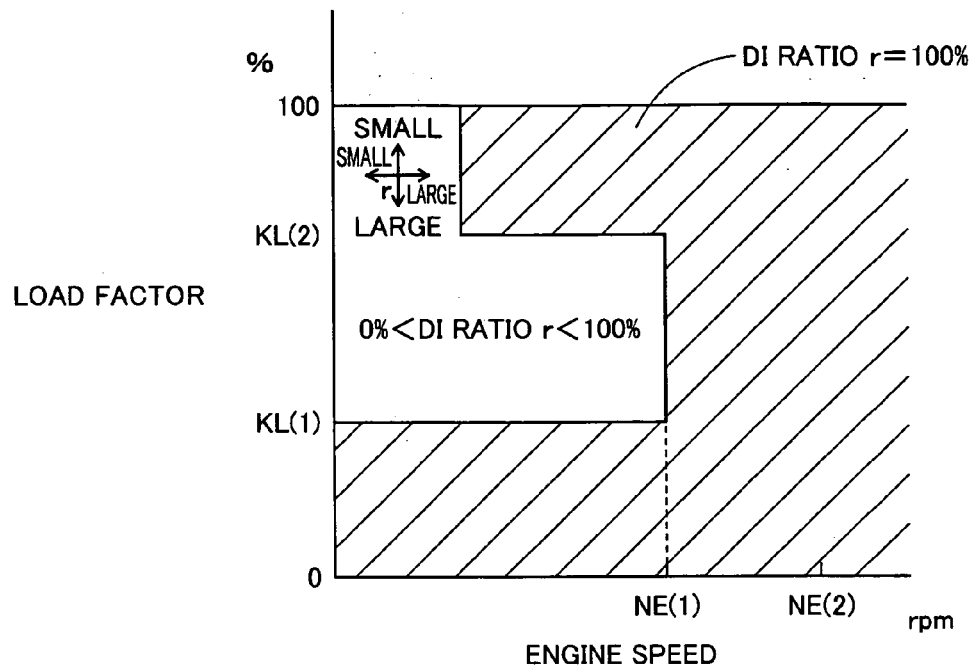
FIGS. 15 and 16 illustrate a second example of the DI ratio setting maps (in the engine warm state and the engine cold state, respectively) in the engine system shown in FIG. 1.
Figure 16:
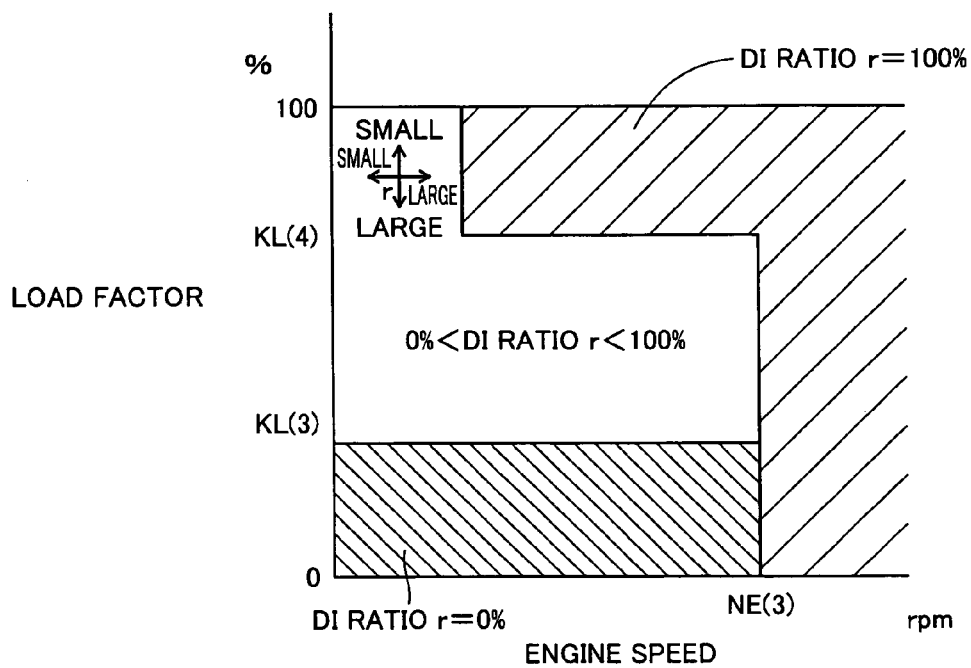

Referring to FIGS. 15 and 16, maps each indicating the fuel injection ratio between in-cylinder injector 110 and intake manifold injector 120, identified as information associated with the operation state of engine 10, will be described. The maps are stored in ROM 320 of engine ECU 300. FIG. 15 is the map for the warm state of engine 10, and FIG. 16 is the map for the cold state of engine 10.

FIGS. 15 and 16 differ from FIGS. 13 and 14 in the following points. "DI RATIO r=100%" holds in the region where the engine speed of engine 10 is equal to or higher than NE(1) in the map for the warm state, and in the region where the engine speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the fuel injection ratio of in-cylinder injector 110, or, the DI ratio r, are shown by crisscross arrows in FIGS. 15 and 16. In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed region, or to increase the fuel injection ratio of in-cylinder injector 110 as the engine state moves toward the predetermined low load region. Further, except for the relevant region (indicated by the crisscross arrows in FIGS. 15 and 16), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In this engine 10 explained in conjunction with FIGS. 13-16, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be established locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture locally around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 13-16, the fuel injection timing of in-cylinder injector 110 is set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Further, in the off-idle state (when the idle switch is off, and the accelerator pedal is being pressed down), the DI ratio map for the warm state as shown in FIG. 13 or 15 may be used (i.e., in-cylinder injector 110 may be used) irrelevant to the temperature of engine 10 (i.e., in both the warm state and the cold state of engine 10).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for a vehicle incorporating an internal combustion engine having a first fuel supply system supplying fuel to first fuel injection means for injecting fuel into a cylinder and a second fuel supply system supplying fuel to second fuel injection means for injecting fuel into an intake manifold, comprising:
   fuel injection control means for controlling a fuel injection ratio between said first fuel injection means and said second fuel injection means with respect to a total fuel injection quantity;
   intermittent operation control means for automatically stopping said internal combustion engine temporarily when a prescribed condition is satisfied after start of operation of said vehicle; and
   first pressure release control means for controlling first pressure release means that is configured to guide the fuel in said first fuel supply system to a pressure release path when actuated; wherein
   said first pressure release control means prohibits actuation of said first pressure release means when said internal combustion engine is in an automatically stopped state by said intermittent operation control means, and
   said fuel injection control means includes first startup-time injection control means for setting a ratio of a quantity of the fuel injected from said first fuel injection means to the total fuel injection quantity near 100% when said internal combustion engine is restarted from said automatically stopped state.

2. The control apparatus for a vehicle according to claim 1, further comprising second pressure release control means for controlling second pressure release means that is configured to release a fuel pressure of said second fuel supply system when actuated, wherein
   said first and second pressure release control means actuate said first and second pressure release means, respectively, in response to stop of said internal combustion engine in association with end of operation of said vehicle.

3. The control apparatus for a vehicle according to claim 2, wherein said first pressure release control means actuates said first pressure release means at the end of operation of said vehicle, after a lapse of a prescribed time that is set to allow a decrease of a temperature of the fuel in said first fuel supply system to a prescribed level.

4. The control apparatus for a vehicle according to claim 1, further comprising fuel pump control means for controlling a fuel pump for securing a fuel pressure necessary for said second fuel supply system, wherein
   said fuel pump control means stops operation of said fuel pump each time when said internal combustion engine is automatically stopped by said intermittent operation control means and when said internal combustion engine is stopped in association with end of operation of said vehicle.

5. The control apparatus for a vehicle according to claim 1, wherein said fuel injection control means includes second startup-time injection control means for setting a ratio of a quantity of the fuel injected from said second fuel injection means to the total fuel injection quantity near 100% when said internal combustion engine is started in association with start of operation of said vehicle.

6. The control apparatus for a vehicle according to claim 5, wherein said vehicle further incorporates a driving force source besides said internal combustion engine,
   said control apparatus further comprising driving force ratio control means for controlling a ratio of driving force generated by said internal combustion engine and by said driving force source in accordance with an operation state, wherein
   said driving force ratio control means includes means for instructing said driving force source to generate driving force corresponding to the driving force required for said vehicle as a whole, when said internal combustion engine is started in association with start of operation of said vehicle, and when a fuel pressure in said second fuel supply system is lower than a required level.

7. A control apparatus for a vehicle incorporating an internal combustion engine having a first fuel supply system supplying fuel to a first fuel injection mechanism for injecting fuel into a cylinder and a second fuel supply system supplying fuel to a second fuel injection mechanism for injecting fuel into an intake manifold, comprising:

a fuel injection control portion configured to control a fuel injection ratio between said first fuel injection mechanism and said second fuel injection mechanism with respect to a total fuel injection quantity;

an intermittent operation control portion configured to automatically stop said internal combustion engine temporarily when a prescribed condition is satisfied after start of operation of said vehicle; and a first pressure release control portion configured to control a first pressure release mechanism that is configured to guide the fuel in said first fuel supply system to a pressure release path when actuated; wherein said first pressure release control portion prohibits actuation of said first pressure release mechanism when said internal combustion engine is in an automatically stopped state by said intermittent operation control portion, and said fuel injection control portion includes a first startup-time injection control portion configured to set a ratio of a quantity of the fuel injected from said first fuel injection mechanism to the total fuel injection quantity near 100% when said internal combustion engine is restarted from said automatically stopped state.

8. The control apparatus for a vehicle according to claim 7, further comprising a second pressure release control portion configured to control a second pressure release mechanism that is configured to release a fuel pressure of said second fuel supply system when actuated, wherein said first and second pressure release control portions actuate said first and second pressure release mechanisms, respectively, in response to stop of said internal combustion engine in association with end of operation of said vehicle.

9. The control apparatus for a vehicle according to claim 8, wherein said first pressure release control portion actuates said first pressure release mechanism at the end of operation of said vehicle, after a lapse of a prescribed time that is set to allow a decrease of a temperature of the fuel in said first fuel supply system to a prescribed level.

10. The control apparatus for a vehicle according to claim 7, further comprising a fuel pump control portion configured to control a fuel pump for securing a fuel pressure necessary for said second fuel supply system, wherein said fuel pump control portion stops operation of said fuel pump each time when said internal combustion engine is automatically stopped by said intermittent operation control portion and when said internal combustion engine is stopped in association with end of operation of said vehicle.

11. The control apparatus for a vehicle according to claim 7, wherein said fuel injection control portion includes a second startup-time injection control portion configured to set a ratio of a quantity of the fuel injected from said second fuel injection mechanism to the total fuel injection quantity near 100% when said internal combustion engine is started in association with start of operation of said vehicle.

12. The control apparatus for a vehicle according to claim 11, wherein said vehicle further incorporates a driving force source besides said internal combustion engine, said control apparatus further comprising a driving force ratio control portion configured to control a ratio of driving force generated by said internal combustion engine and by said driving force source in accordance with an operation state, wherein said driving force ratio control portion instructs said driving force source to generate driving force corresponding to the driving force required for said vehicle as a whole, when said internal combustion engine is started in association with start of operation of said vehicle, and when a fuel pressure in said second fuel supply system is lower than a required level.

* * * * *